(12) United States Patent
Becker et al.

(10) Patent No.: US 7,314,249 B2
(45) Date of Patent: Jan. 1, 2008

(54) AUTOMOTIVE VEHICLE SEAT WITH A LENGTHWISE ADJUSTMENT DEVICE, A SEAT CARRIER AND REAR ROCKERS

(75) Inventors: Burckhard Becker, Solingen (DE); Wilfried Beneker, Leichlingen (DE)

(73) Assignee: C. Rob Hammerstein GmbH & Co., KG, Solingen (DE)

( * ) Notice: Subject to any disclaimer, the term of this patent is extended or adjusted under 35 U.S.C. 154(b) by 0 days.

(21) Appl. No.: 11/171,669

(22) Filed: Jun. 29, 2005

(65) Prior Publication Data

US 2006/0001306 A1    Jan. 5, 2006

(30) Foreign Application Priority Data

Jul. 2, 2004   (DE) ...................... 10 2004 032 384
Feb. 2, 2005   (DE) ...................... 10 2005 004 660

(51) Int. Cl.
*A47C 1/00*      (2006.01)
*B60R 22/00*     (2006.01)

(52) U.S. Cl. .................... 297/344.15; 297/468
(58) Field of Classification Search ............ 297/216.1, 297/344.15, 325, 344.17, 468; 248/420, 248/421, 429
See application file for complete search history.

(56) References Cited

U.S. PATENT DOCUMENTS

| | | | |
|---|---|---|---|
| 4,225,184 A * | 9/1980 | Strowick ...................... | 297/468 |
| 4,790,597 A * | 12/1988 | Bauer et al. ................. | 297/468 |
| 6,069,325 A * | 5/2000 | Aoki ........................... | 177/136 |
| 6,299,252 B1 | 10/2001 | Frohnhaus et al. | |
| 6,397,688 B1 * | 6/2002 | Sakamoto et al. ...... | 73/862.637 |
| 6,517,157 B1 * | 2/2003 | Vorac ..................... | 297/344.13 |
| 6,653,577 B2 * | 11/2003 | Breed et al. ................ | 177/144 |
| 6,843,460 B2 * | 1/2005 | Koga et al. ................. | 248/421 |
| 6,940,026 B2 * | 9/2005 | Rundell et al. ............. | 177/144 |
| 7,036,878 B2 * | 5/2006 | Masutani ................. | 297/216.1 |

* cited by examiner

Primary Examiner—Sarah B. McPartlin
(74) Attorney, Agent, or Firm—McCarter & English, LLP

(57) ABSTRACT

The automotive vehicle seat has a lengthwise adjustment device, a seat carrier and two rear rockers that are disposed between the seat carrier and the lengthwise adjustment device and that are each connected at an upper hinge point to the seat carrier and at a lower hinge point to the lengthwise adjustment device and a seat belt comprising a belt end on one side and a belt buckle on the other side of the seat. A fastening point, to which a respective one of the belt end and the belt buckle is fastened, is provided on at least one of the rear rockers. The fastening point is located in proximity to the lower hinge point and is nearer to the lower hinge point than to the upper hinge point.

17 Claims, 2 Drawing Sheets

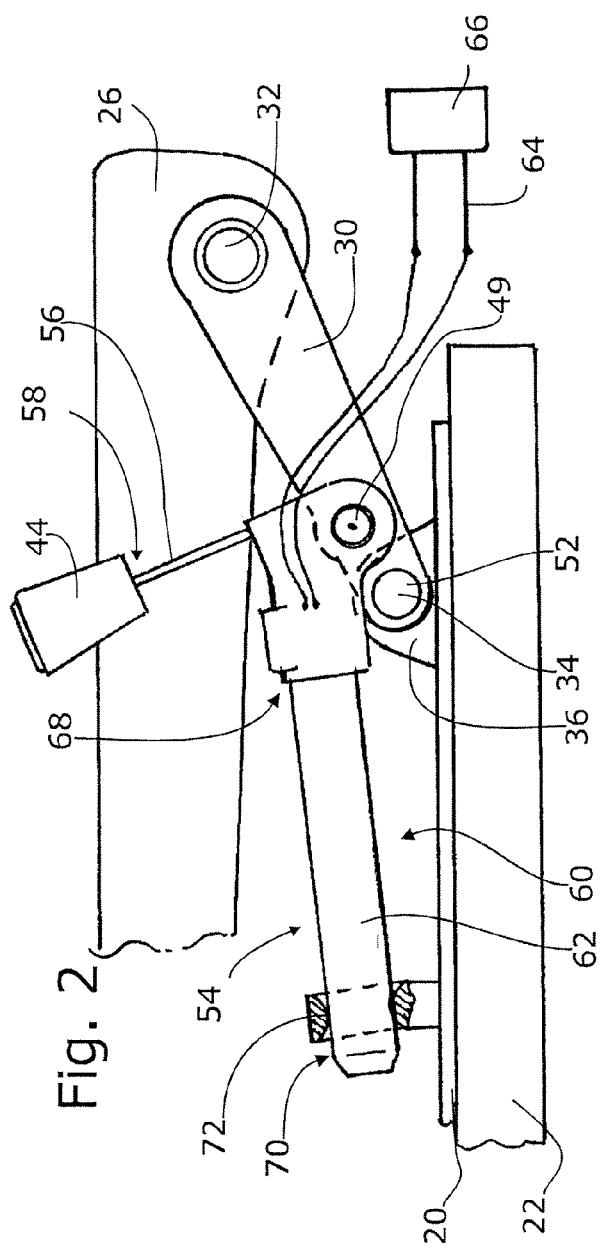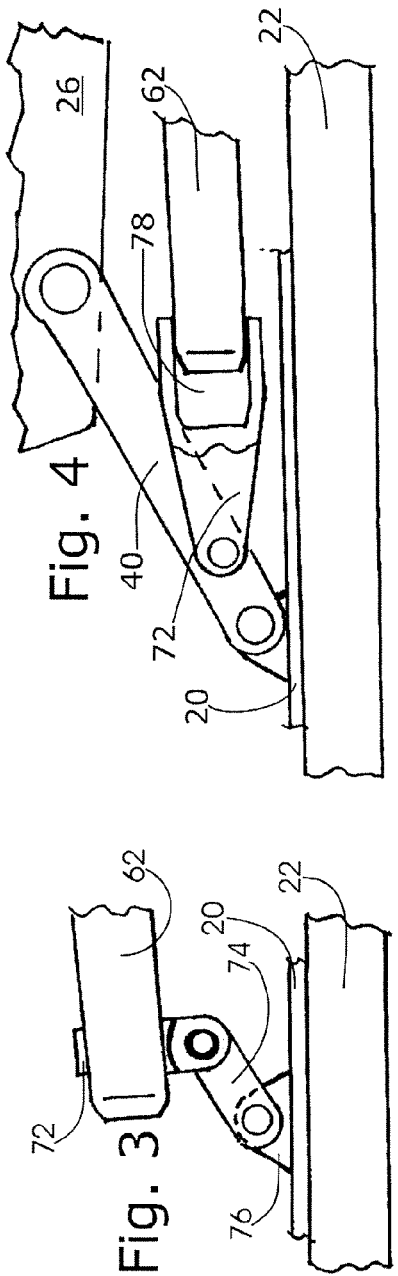

AUTOMOTIVE VEHICLE SEAT WITH A LENGTHWISE ADJUSTMENT DEVICE, A SEAT CARRIER AND REAR ROCKERS

FIELD OF THE INVENTION

The invention relates to an automotive vehicle seat having a lengthwise adjustment device, a seat carrier and two rear rockers that are disposed between the seat carrier and the lengthwise adjustment device and that are each connected at an upper hinge point to the seat carrier and at a lower hinge point to the lengthwise adjustment device and having a seat belt comprising a belt end on one side and a belt buckle on the other side of the seat, a fastening point to which a respective one of the belt end and the belt buckle is fastened being provided on at least one of the rear rockers.

DESCRIPTION OF THE RELATED ART

A vehicle seat of this type is known from U.S. Pat. No. 6,299,252 B1. This patent is more specifically directed to the lap belt of a V-belt. The prior art seat belt has the fastening point for the belt buckle disposed in the top half of the distance between the two hinge points of the associated rear rocker. Basically, this arrangement has proved efficient.

Under crash load conditions, a high tensile force is applied to the fastening point. Depending on the angular position of the associated rear rocker, said rocker is not only subjected to a tensile load but is also pivoted. The associated rear rocker may thereby deform and at any rate provides a certain amount of give. This give is effected by the pivoting movement mentioned and/or by the deformation of the rear rocker.

SUMMARY OF THE INVENTION

This is where the invention comes in. It aims at disposing the fastening point at a location where deformation and relative movements occur least during a crash, meaning at fastening the seat belt as rigidly as possible in order to ensure good diversion of the occurring forces.

In view thereof, it is the object of the invention to develop the automotive vehicle seat of the type mentioned herein above in such a manner that the lap portion of the seat belt is fastened at the fastening point so that crash loads are as far as practicable directly introduced into an underbody of an automotive vehicle to which the automotive vehicle seat is connected, with the parts mounted therein between being subjected to the least possible extent to deformation and relative movement.

This object is solved by the automotive vehicle seat comprising a lengthwise adjustment device, a seat carrier and two rear rockers disposed between the seat carrier and the lengthwise adjustment device. The two rear rockers are each connected at an upper hinge point to the seat carrier and at a lower hinge point to the lengthwise adjustment device; additionally, the two rockers have a seat belt comprising a belt end on one side and a belt buckle on the other side of the seat, a fastening point to which a respective one of the belt end and belt buckle is fastened being provided in vicinity of at least one of the rear rockers. The fastening point is located directly on at least one of the rear rockers and the fastening point is located in proximity to the lower hinge point. In one embodiment, the fastening point is nearer to the lower hinge point than to the upper hinge point.

Accordingly, a fastening point is associated with at least one of the two rear rockers. This fastening point receives either the end of the belt or the belt buckle. Preferably, each of the two rear rockers has one fastening point, with one rear rocker comprising a fastening point for the belt buckle and the other rear rocker a fastening point for the end of the belt. Preferably, the fastening point of the belt end is formed on the rear rocker located on the outboard side of the vehicle.

As the fastening point is disposed in proximity to the lower hinge point, a crash load is applied to quite a low part of the respective one of the rear rockers so that said rocker is less loaded in the direction of rotation than in prior art devices. As the fastening point is low, the distance to the lengthwise adjustment device is short and the path on which crash loads are introduced into an underbody is short.

BRIEF DESCRIPTION OF THE DRAWINGS

Other features and advantages of the invention will become more apparent upon reviewing the appended claims and the following non restrictive description of embodiments of the invention, given by way of example only with reference to the drawing. In said drawing:

FIG. 2: is a partial side view of a second exemplary embodiment, looking onto the inboard side of the seat, FIG. 3: is a portion of an illustration similar to FIG. 2, but for a third implementation and FIG. 4: is a partial side view similar to FIG. 2, but now for a fourth configuration.

DETAILED DESCRIPTION

Figure 1:
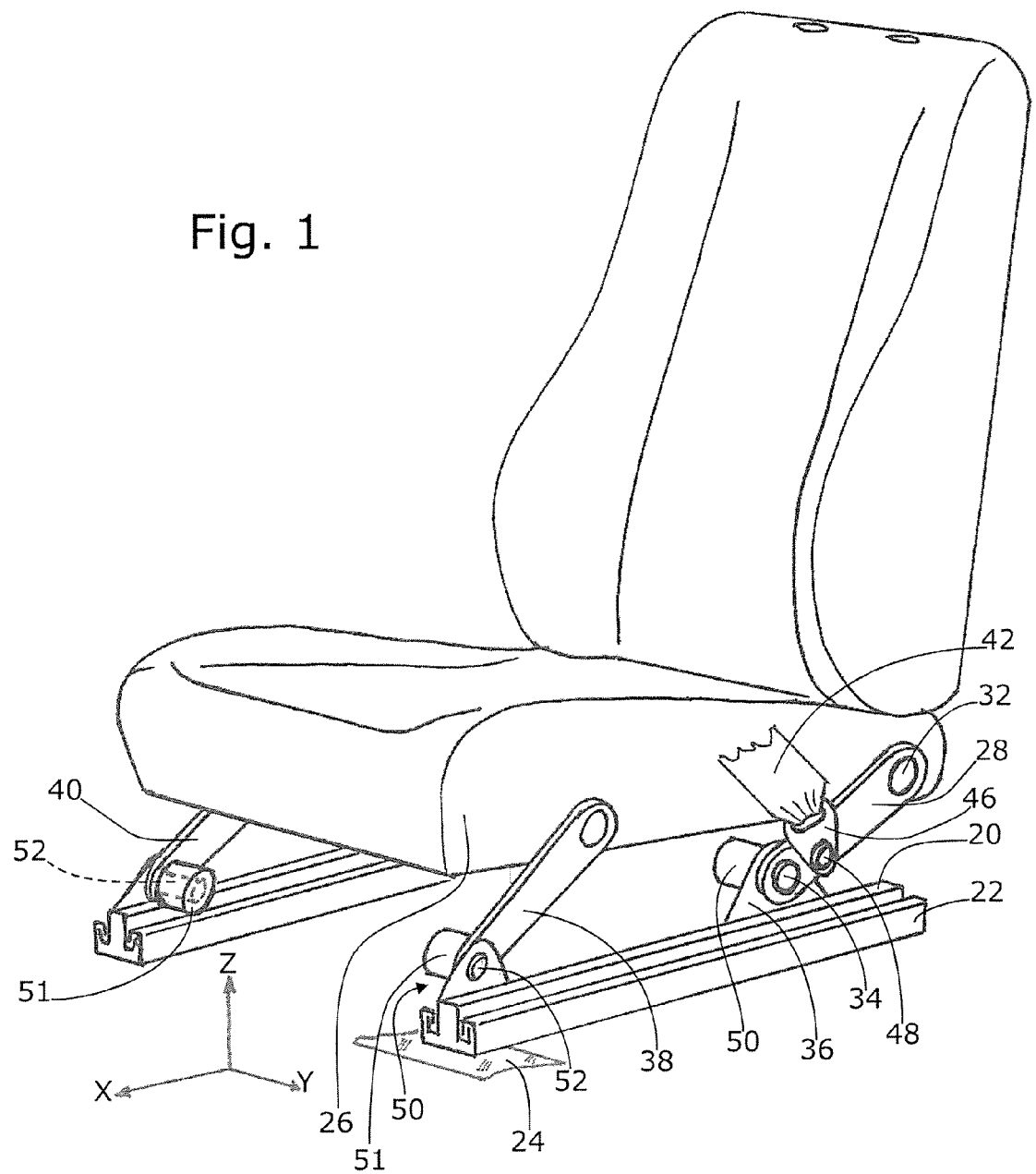
FIG. 1: is a perspective view of an automotive vehicle seat looking onto the outboard side of the seat.

The automotive vehicle seat has a lengthwise adjustment device which, in the embodiment shown, has a pair of rails on either side of the seat, each of said pairs of rails comprising a seat rail 20 and a floor rail 22. The floor rails 22 are connected to an underbody 24 of the automotive vehicle when the automotive vehicle seat is in its mounted state. The automotive vehicle further has a seat carrier 26 and two rear rockers, namely a left or outboard-side rear rocker 28 and a right or inboard-side rear rocker 30. Said rockers 28, 30 are hinged at an upper hinge point 32 to the seat carrier 26 and at a lower hinge point 34 to the seat rail 20, more precisely to a bearing pillow 36 belonging to said seat rail 20. Further, front rockers are provided, namely a left or outboard-side front rocker 38 and a right or inboard-side front rocker 40. Together with the seat carrier 26 and the associated seat rail 20, the rockers form a four-bar linkage. A prior art adjustment device is associated with at least one four-bar linkage; said adjustment device has not been illustrated herein.

Further, the automotive vehicle seat has a seat belt of which FIG. 1 only shows a belt end 42 that is part of the lap belt. It is located in a known manner on the outboard side of the seat. FIG. 2 shows a belt buckle 44 of the safety belt; it is located on the inboard side of the seat and will be discussed in closer detail herein after. The belt end 42 comprises an end mounting 46 where the textile part of the lap belt is fixed, said end mounting 46 being hinged at a first fastening point 48 to the outboard-side rear rocker 28. Said fastening point is located in proximity to the lower hinge point 34. In the embodiment shown, the fastening point of the belt end or first fastening point 48 is disposed in the lower third of the distance between the lower hinge point 34 and the upper hinge point 32. It is preferably located at the nearest possible distance from the lower hinge point 34, and is preferably formed in the lower fourth of the effective length of the rear rocker 28. The first fastening point 48 is preferably a bolt or a screw and protrudes transversely outward from the rear rocker 28 that is implemented as a flat component part.

The vehicle seat of FIG. 1 comprises an occupant weight sensing system that will be discussed in closer detail herein after. For sensing the occupant's weight, one sensor 50 is respectively associated with each lower hinge point 34 of the two rear rockers 28, 30 and with each corresponding lower hinge point of the two front rockers 38, 40, with the sensors 50 used being built according to the same design principle. They are built in the following manner: the sensors 50 have a cup-shaped housing that can be seen from FIG. 1. Centrally within said housing there is located a bolt 52 that, in FIG. 1, is outlined on one sensor and is moreover visible on two other sensors. At one end, said bolt is disposed on a bottom of the cup-shaped housing with the bottom of the cup pointing toward the center of the seat. In the region of the other end, the bolt forms a pivot hinge for the respective one of the rockers. The bolts are oriented in the y-direction. The bolts 52 are free to engage through a bearing hole in the respective one of the bearing pillows 36. The deviation of the bolt 52 relative to the cup-shaped housing is sensed by suited measuring means, such as inductively or by means of resistance strain gauges. Put another way, the displacement of the respective one of the rockers relative to the bearing pillow 36 is measured. Actually, the displacements are very small, for example on the order of 1 mm and less.

Other sensors than the sensors 50 shown can be utilized. The rocker may for example be hinged to a bearing pillow 36 and the bearing pillow itself may comprise resistance strain gauges for detecting a change of length of the bearing pillow when loaded with the weight of an occupant. Sensors having an upright bolt and a crosspiece attached thereto may also be used on the seat rail 20.

It is important that the sensor 50 be located beneath the first fastening point 48. Thus, internal stresses within the seat belt, more specifically within the lap portion thereof, will not affect the result of the measurement delivered by the sensors 50.

FIG. 1 shows an automotive vehicle seat in which only the outboard side of the seat comprises a fastening point 48 configured in accordance with the invention. The other seat side is not illustrated in FIG. 1. It will be explained now with reference to the other exemplary embodiments. It is preferred that the automotive vehicle seat have one fastening point 48 on either side of the seat.

FIG. 2 shows an inboard side rear rocker 30 that is hinged at the upper hinge point 32 to the seat carrier 26 and at the lower hinge point 34 to the associated seat rail 20 via a bearing pillow 36 of said seat rail. There can be provided a sensor 50 although FIG. 2 does not show any. The invention can be carried out with and without sensors 50.

The rear rocker 30 has a fastening point of the belt end or second fastening point 49 where a belt tensioner is hinged. With reference to the distance of the second fastening point 49 from the lower hinge point 34, what has been said herein above applies. It is preferred that both fastening points, if provided, be configured in the same manner and be disposed at the same distance from the lower hinge point. In the embodiment shown in FIG. 2, the fastening point 49 is located at a distance from the lower hinge point 34 of about 20% of the overall effective length of the rocker 30. Effective length means the distance between the hinge points 32, 34.

The belt tensioner 54 comprises a pull member 56 that is only partially visible. In its visible portion to which an upper end 58 belongs, it is connected to the belt buckle 44 which it carries, meaning, it is configured accordingly. The pull member 57 is for example a rigid bendable part.

The belt tensioner 54 has a tensioner unit 60. It has an elongate body 62 that is substantially tubular and in which there is located a piston. Said tensioning unit is moved forward (substantially in the x-direction) by means of a pyrotechnic device. The pyrotechnic device is electrically ignited, with electrical connectors 64 for connecting the belt tensioner to a crash sensor 66 being provided for this purpose. In a crash situation of the automotive vehicle in which the automotive vehicle seat is mounted, said crash sensor enables said tensioner unit in a known manner and can also trigger other parts such as airbags.

The elongate body has a rear end 68 and a front end 70. The rear end is plugged into a housing that also ensures articulation to the second fastening point 49, the fastening point for the belt buckle. The pull member 56 enters said housing and is deflected toward the elongate body 62. It is connected to the piston. In proximity to the front end 70, there is located a guide member 72. The FIGS. 2 through 4 illustrate three different implementations of said guide member. All the exemplary embodiments share the feature that the elongate body 62 is capable of being displaced substantially in the x-direction relative to the guide member 72.

In the embodiment as shown in FIG. 2, the guide member 72 substantially is an eye that is solidly connected to the seat rail 20. The actual guide region is configured to be crowned within so that the elongate body 62 is allowed to assume different angular positions with respect to the guide member 72 within a certain angular range. The guide member of FIG. 2 is disposed between a front rocker 40 and the rear rocker 30. Its height above the seat rail 20 is chosen to be oriented substantially parallel to the longitudinal direction of the rails 20, 22 or substantially in the x-direction.

In the implementation as shown in FIG. 3, the guide member 72 is not hinge-linked directly to the seat rail but through a coupler 74 to a pillow 76; the pillow 76 is fastened to the seat rail 20 in a position similar to the one in the exemplary embodiment of FIG. 2. In the configuration as shown in FIG. 3, the actual guide region, meaning the inner wall of the guide member 72, is also crowned so that different angular positions may be assumed. This time however, these positions are made substantially possible by orienting the coupler 74 in different ways. It is preferred that the distance between the hinges of the coupler 74 be equal to the distance between the lower hinge point 34 and the second fastening point 49. A four-bar linkage is thus provided and the elongate body 62 remains largely independent of the angular position of the rockers, substantially in one direction, namely substantially in the x-direction.

In the implementation of FIG. 4, the guide member 72 has a recess 78 that is open toward the back and into which engages the front end 60 of the elongate body 62. The guide member 72 is hinged at one hinge point to the front rocker 40. The distance between the hinges again substantially corresponds to the corresponding distance between the second fastening point 49 and the lower hinge point 34 so that a four-bar linkage is formed here as well. The special guide means 72 permits relative movements that occur as a result of the different length of the identically built front rockers 38, 40 as compared to the identically built rear rockers 28, 30 and of the different angular positions of said pairs of rockers 28, 30 and 38, 40 respectively.

The automotive vehicle seat of the invention is particularly provided for a passenger front seat next to the driver's seat. In its configuration with the weight sensors, it is possible to trigger one or a plurality of associated airbags, depending on the weight of the passenger.

The invention claimed is:

1. An automotive vehicle seat comprising:
   a lengthwise adjustment device;
   a seat carrier;
   two rear rockers disposed between said seat carrier and said lengthwise adjustment device, said two rear rockers are each connected at an upper hinge point to said seat carrier and at a lower hinge point to said lengthwise adjustment device;
   a seat belt comprising a belt end on one side and a belt buckle on the other side of the seat; and
   a fastening point to which a respective one of said belt end and said belt buckle is directly fastened, wherein said fastening point is positioned at a fixed location on at least one of said rear rockers nearer to said lower hinge point than to said upper hinge point and spaced apart from said lower hinge.

2. The automotive vehicle seat as set forth in claim 1, wherein lengthwise adjustment device comprises a pair of rails on each seat side, each having a floor rail and a seat rail, and a sensor for detecting the weight of an occupant, said sensor being disposed between the fastening point and the seat rail disposed therebeneath.

3. The automotive vehicle seat as set forth in claim 2, wherein said sensor for detecting the weight of an occupant senses a torque or a weight.

4. automotive vehicle seat as set forth in claim 1, wherein said fastening point is located in a lower third of a distance between said lower hinge point and said upper hinge point.

5. The automotive vehicle seat as set forth in claim 4, wherein said fastening point is located in a lower quarter of a distance between said lower hinge point and said upper hinge point.

6. The automotive vehicle seat as set forth in claim 1, wherein said belt end comprises an end mounting, said end mounting is hinged at said fastening point to one of said two rear rockers.

7. The automotive vehicle seat as set forth in claim 6, wherein said end mounting is mounted to an outboard-side rear rocker of said two rear rockers.

8. The automotive vehicle seat as set forth in claim 1, wherein said belt buckle is connected to a belt tensioner, said belt tensioner is hinged to one of said two rear rockers at said fastening point.

9. The automotive vehicle seat as set forth in claim 8, wherein said belt tensioner is hinged to an inboard-side rear rocker of said two rear rockers.

10. The automotive vehicle seat as set forth in claim 8, wherein said belt tensioner comprises a pull member, said pull member has an upper end and a lower end, said upper end is connected to said belt buckle which it carries, said belt tensioner comprises a tensioner unit to which said lower end of said pull member is connected, said tensioner unit is connected to a crash sensor that enables said tensioner unit in a crash situation of the automotive vehicle in which the automotive vehicle seat is mounted and said tensioner unit exerts a tensile force onto said pull member to thereby pull said belt buckle substantially downward.

11. The automotive vehicle seat as set forth in claim 8, wherein said belt tensioner has an elongate body, said elongate body comprises a front end and a rear end, said elongate body is hinged to said fastening point in proximity to said rear end and said elongate body is slidably retained in a guide member.

12. The automotive vehicle seat as set forth in claim 11, wherein said seat carrier is hinge-linked to said lengthwise adjustment device through two front rockers and said guide member is disposed on one of said front rockers.

13. The automotive vehicle seat as set forth in claim 11, wherein said lengthwise adjustment device comprises one pair of rails on either seat side each having one floor rail and one seat rail, and said guide member is connected to said one seat rail.

14. The automotive vehicle seat as set forth in claim 11, wherein said elongate body is always parallel to a direction of adjustment of said lengthwise adjustment device, respectively, irrespective of an angular position of said rear rockers to which it is hinged.

15. The automotive vehicle seat as set forth in claim 12, wherein said guide member is hinged to an inboard-side of said one of said front rockers at a distance from a lower hinge of said one of said front rockers, said distance corresponding to a distance between said fastening point and said lower hinge point of said rear rocker on an inboard-side.

16. The automotive vehicle seat as set forth in claim 12, wherein said guide member is hinged to an inboard-side front rocker of said one of said front rockers.

17. The automotive vehicle seat as set forth in claim 13, wherein said guide member is hinge-linked to said one seat rail.

* * * * *